UNITED STATES PATENT OFFICE.

CHARLES R. DOWNS, OF CLIFFSIDE, NEW JERSEY, ASSIGNOR TO THE BARRETT COMPANY, A CORPORATION OF NEW JERSEY.

DEHYDRATION OF PYRIDIN.

1,290,124.

Specification of Letters Patent.     Patented Jan. 7, 1919.

No Drawing.     Application filed April 24, 1918.     Serial No. 230,489.

*To all whom it may concern:*

Be it known that I, CHARLES R. DOWNS, a citizen of the United States, residing at Cliffside, in the county of Bergen and State of New Jersey, have invented certain new and useful Improvements in Dehydration of Pyridin, of which the following is a specification.

This invention relates to the dehydration of crude pyridin bases or pyridin hydrate and has for its object the complete removal of the water in a rapid, economical, and efficient manner.

Heretofore it has been customary to remove water from pyridin hydrate by dehydrating with a strong solution of sodium hydroxid followed by a treatment with lumps of sodium hydroxid. In order to effect complete removal of the water or absolute dehydration of pyridin in this way it is necessary to use a large amount of solid sodium hydroxid, and it is necessary to repeat the operations a number of times and to permit contact with solid sodium hydroxid for a number of days in order to insure the desired result.

My invention possesses an advantage over the prior process in that the pyridin can be rapidly dehydrated in one operation with very little loss of pyridin or other materials.

In order to explain the principle of my invention, attention will be called to the fact that pyridin and benzol (benzene) or pyridin, benzol and water do not form mixtures which boil at constant temperatures. For example, when a mixture of equal weights of benzol and pyridin are distilled, some of the pyridin comes over below 90° C. and some of the benzol remains in the mixture after the temperature reaches 100° C., and there is no indication of a constant boiling point for the mixture or of a sharp separation of the components between these points.

On the other hand pyridin hydrate ($C_5H_5N+3H_2O$) has a constant boiling point of about 92.5° C., while benzol and water, in the proportions of 10.325 to 1 by weight, or 11.73 to 1 by volume, form a mixture which boils constantly at about 69.5° C.

I have found that it is possible to dehydrate crude pyridin bases or pyridin hydrate by adding to the crude pyridin bases or the pyridin hydrate a substance which forms such a mixture with water that the mixture will distil at a temperature below the boiling point of the pyridin bases without, at the same time, carrying over an undue amount of pyridins. For this purpose, and in accordance with my invention, I may take a crude pyridin which has a water content of say 15% by volume and add benzol to the amount of about 11.73 times the content of water by volume, thus obtaining the approximate, theoretically correct proportion of benzol to water of about 10.325 to 1 by weight. The amount of benzol to be added will depend upon the amount of water content in the pyridin. The desideratum to be reached being always the ratio of 10.325 to 1, which is the suitable proportion as calculated from the molecular weights of benzol and water and their vapor pressures at 69.5° C. It is impractical in commercial practice to attain this exact proportion as the water content varies greatly in different crudes. If too little benzol is used some of the water will not be removed from the pyridin bases, and if too much benzol is used it entails needless expense in subsequently separating it from the pyridin bases.

The pyridin hydrate or wet pyridin bases to which the desired amount of benzol has been added is then distilled, preferably in a column still, and the distillates are usually condensed and separated into three fractions; that below 80° C., that between 80° C. and 115° C., and that above 115° C. These ranges of temperature may be varied to suit the particular materials. The particular temperatures specified are given for illustrative purposes. With all materials the fractionations will be so regulated that the first fraction contains nearly all of the water; the second fraction contains substantially all the rest of the water, some benzol and a little pyridin bases; and the last fraction contains only pyridin or pyridin bases. Only two fractions may be obtained, however; that containing all of the water, and that containing only pyridin or pyridin bases.

The first fraction consisting of water and benzol containing some pyridin or pyridin bases in solution separates into two layers. Because of the relative solubilities of the pyridins in water and benzol the water layer at the bottom contains very little, usually less than 0.2%, of the pyridins charged and may be drawn off and discarded. The benzol layer at the top contains pyridins in solution and may, therefore, be used again in distilling the next batch, thus saving the pyridins.

The second fraction, which contains very little water mixed with benzol and some pyridin is returned to the still for the next distillation and this pyridin is thereby prevented from being lost.

The last fraction is free from water and benzol, being relatively pure dehydrated pyridin or dry pyridin bases.

By carrying out this process a dehydrated pyridin can be obtained by a single distillation with the loss of only that small portion of the pyridin which remains in solution in the layer of water from the first fraction of the distillate.

If desired, the pyridin bases may first be shaken with the desired amount of benzol, the mixture allowed to settle, and the water which necessarily contains some of the pyridin bases in solution drawn off, and the remainder of the mixture distilled as above described to obtain the dehydrated bases.

Or, the pyridin bases may first be shaken with a saturated salt solution and benzol, the layer of water drawn off and the remainder distilled as before indicated.

In the two last instances a considerable amount of pyridin is lost in the water layer, but there is no loss of pyridin in the distillation operation since the fractions of distillates containing pyridin in solution are the benzols which are introduced into other batches preparatory to the distillation of the same, thereby recovering the pyridin.

It will be understood that where I use the term pyridin I intend to include the pyridin bases or pyridin and its homologues. It is also obvious that instead of carrying out the distillation above the boiling point of pyridin, the distillation can be stopped after the second fraction, above indicated, has been collected, in which case the pyridin will remain in the still. It is preferable, however, to continue the distillation as I thereby obtain distilled pyridin with very little added expense.

What I claim is:

1. The process of dehydrating pyridin bases which comprises the steps of adding benzol to said bases and distilling.

2. The process of dehydrating pyridin bases which comprises the steps of adding benzol to said bases and subjecting the mixture to fractional distillation.

3. The process of dehydrating pyridin bases which comprises the steps of adding benzol to said bases and distilling to remove the benzol and water.

4. The process of dehydrating pyridin bases which comprises the steps of adding benzol to said bases, distilling, and separating the fraction of the distillate which is substantially free of benzol and water from the other portion of the distillate.

5. The process of dehydrating pyridin bases which comprises the steps of adding to said bases about eleven times as much benzol as the water content of said bases and distilling to remove the benzol and water.

6. The process of dehydrating pyridin bases which comprises the steps of adding to said bases about eleven times as much benzol as the water content of said bases and subjecting the mixture to fractional distillation.

7. The process of dehydrating pyridin bases which comprises the steps of adding to said bases about eleven times as much benzol as the water content of said bases, distilling to remove the benzol and water, and raising the temperature of the mixture to a point above the boiling point of said bases.

8. The process of dehydrating pyridin bases which comprises the steps of adding benzol to said bases, distilling, collecting separate fractions, removing water from the first fraction and adding the remainder of said first fraction to another batch of pyridin bases.

9. The process of dehydrating pyridin bases which comprises the steps of adding bezol to said bases, distilling, collecting separate fractions, removing water from the first fraction and adding the remainder of said first fraction and the whole of the second fraction to another batch of pyridin bases.

10. The process of dehydrating pyridin bases which comprises the steps of adding benzol to said bases, distilling until the temperature rises above 115° C., collecting separate fractions, removing water from the first fraction and adding the remainder of said first fraction to another batch of pyridin bases.

11. The process of dehydrating pyridin bases which comprises the steps of adding to said bases about eleven times as much benzol as the water content of said bases, distilling, collecting separate fractions, removing water from the first fraction and adding the remainder of said first fraction to another batch of pyridin bases.

12. The process of dehydrating pyridin bases which comprises the steps of adding to said bases about eleven times as much benzol as the water content of said bases, distilling, collecting separate fractions, removing water from the first fraction and adding the remainder to said first fraction and the whole of the second fraction to another batch of pyridin bases.

13. The process of dehydrating pyridin bases which comprises the steps of adding benzol to said bases, shaking, drawing off water, and distilling the remainder.

14. The process of dehydrating pyridin bases which comprises the steps of adding benzol to said bases, shaking, drawing off water, distilling, collecting separate fractions, removing water from the first fraction and adding the remainder of said first fraction to another batch of pyridin bases.

15. The process of completely dehydrating pyridin hydrate which consists in adding to a batch of said hydrate an amount of benzol equal to about eleven times the weight of water in said hydrate, subjecting the mixture to fractional distillation, permitting the first fraction to settle, removing water from said first fraction, adding the remainder of said first fraction to a second batch of pyridin hydrate, adding the intermediate fraction or fractions to said second batch of pyridin hydrate, and maintaining the last fraction separated from the other fractions.

16. The process of completely dehydrating pyridin hydrate which consists in adding to a batch of said hydrate an amount of benzol equal to about eleven times the weight of water in said hydrate, subjecting the mixture to fractional distillation, collecting the distillates in three fractions up to 80° C., between 80° C. and 115° C., and above 115° C., respectively, permitting the first fraction to settle, removing water from said first fraction, adding the remainder of said first fraction to a second batch of pyridin hydrate, adding the intermediate fraction to said second batch of pyridin hydrate, and maintaining the last fraction separated from the other fractions.

In testimony whereof I affix my signature.

CHARLES R. DOWNS.